United States Patent [19]

LaPointe

[11] 4,072,441
[45] Feb. 7, 1978

[54] HOLE SAW

[75] Inventor: Gabriel M. LaPointe, Worcester, Mass.

[73] Assignee: Parker Manufacturing Company, Worcester, Mass.

[21] Appl. No.: 677,381

[22] Filed: Apr. 15, 1976

[51] Int. Cl.² ............................................ B23B 51/04
[52] U.S. Cl. ..................................... 408/204; 144/23; 403/330
[58] Field of Search ............... 408/204, 703, 226, 205, 408/206; 144/23; 403/329, 330, 354, 359, 404

[56] References Cited

U.S. PATENT DOCUMENTS

| 1,039,354 | 9/1912 | Bonadio | 403/239 X |
| 1,994,516 | 3/1935 | Hawn | 408/204 X |
| 2,473,077 | 6/1949 | Starbuck, Jr. | 408/703 X |
| 3,262,474 | 7/1966 | Enders | 144/23 X |
| 3,374,696 | 3/1968 | Trevathan | 408/226 |
| 3,854,840 | 12/1974 | Miyanaga | 408/204 |
| 3,970,407 | 7/1976 | Uffman | 408/204 |

Primary Examiner—Z. R. Bilinsky
Attorney, Agent, or Firm—Norman S. Blodgett; Gerry A. Blodgett

[57] ABSTRACT

Hole saw consisting of a hardened metal tube with ground teeth at one end and a plastic cap at the other end.

4 Claims, 6 Drawing Figures

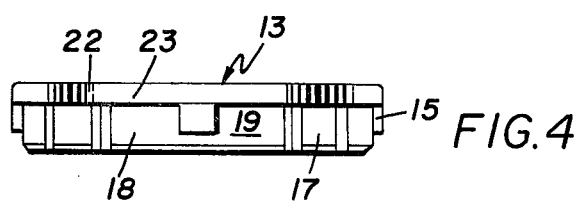
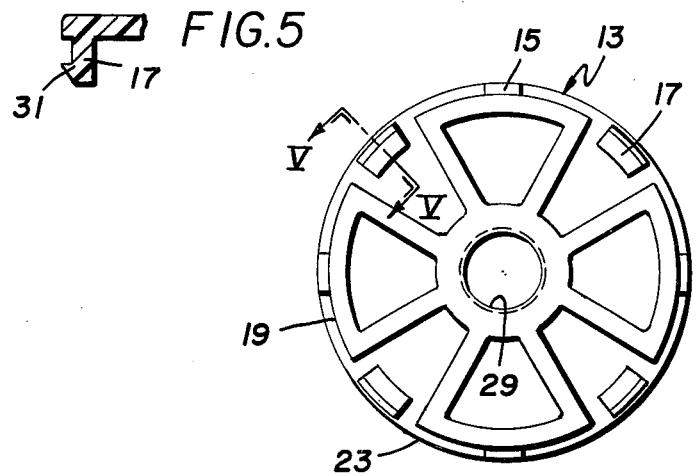
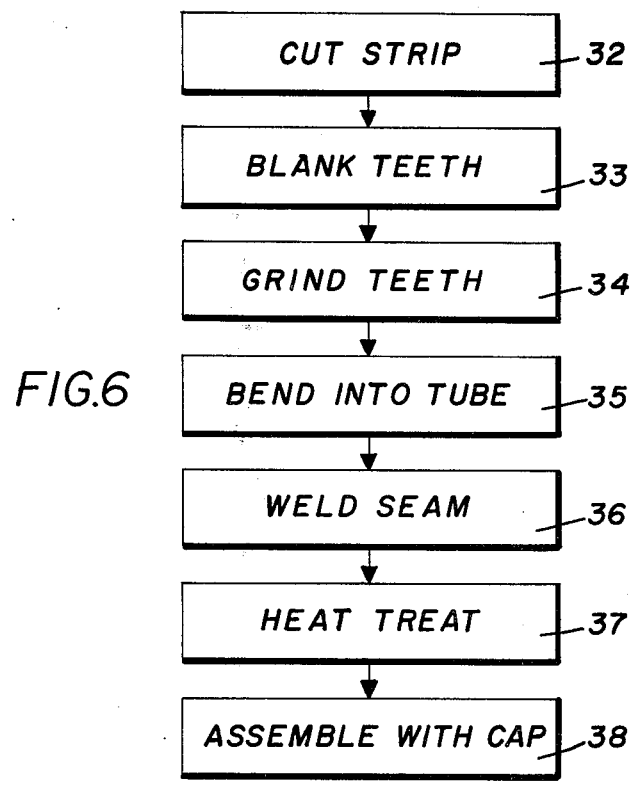

HOLE SAW

BACKGROUND OF THE INVENTION

It is common practice to form holes in wood and metal by a trepaning operation, involving a metal cup in which the edges of the cup are formed with teeth. The cup is mounted on a mandrel and the mandrel, in turn, is mounted in an electric drill. Normally, the cup is deep drawn from a low carbon steel. There are a number of difficulties that have been experienced with these devices, however. First of all, the fact that the cup is formed from low carbon steel means that the teeth are not hard enough to last a long period of time when cutting wood and will not cut metal at all well, except possibly soft metals. It is, of course, not possible to deep draw high carbon steels. Another difficulty experienced is that the machining of the teeth is difficult, since the cup has to be mounted in a special machine for punching the teeth one at a time and grinding must take place in a similar manner. This is a relatively time-consuming operation and, therefore, causes the price of the finished article to be quite high. These and other difficulties experienced with the prior art devices have been obviated in novel manner by the present invention.

It is, therefore, an outstanding object of the invention to provide a hole saw capable of a long life when used in trepaning operations on wood.

Another object of this invention is the provision of a hole saw capable of cutting metal.

A further object of the present invention is the provision of a hole saw which is relatively easy to manufacture.

It is another object of the instant invention to provide a hole saw formed of a high carbon steel and provided with ground teeth.

A still further object of the invention is the provision of a hole saw which is simple in construction, which is inexpensive to manufacture, and which is capable of a long life of useful service with a minimum of maintenance.

It is a further object of the invention to provide a method for making a hole saw from high carbon steel.

With these and other objects in view, as will be apparent to those skilled in the art, the invention resides in the combination of parts set forth in the specification and covered by the claims appended hereto.

SUMMARY OF THE INVENTION

In general, the invention consists of a hole saw formed of a hardened metal tube having teeth formed at one end edge. A cap formed of a tough polymer is fitted to the other end of the tube. Means is provided for locking the cap and the tube together in driving relationship.

More specifically, the hole saw is made by grinding teeth on one edge of a strip of high carbon steel and then forming the strip into the tube, which is then subjected to heat treatment.

BRIEF DESCRIPTION OF THE DRAWINGS

The character of the invention, however, may be best understood by reference to one of its structural forms, as illustrated by the accompanying drawings, in which:

FIG. 3 is a plan view of a cap forming part of the invention, FIG. 4 is a front elevational view of the cap, FIG. 5 is a sectional view of the cap taken on the line V—V of FIG. 3, and FIG. 6 is a flow chart illustrating the method of making the hole saw.

DESCRIPTION OF THE PREFERRED EMBODIMENT

Figure 1:
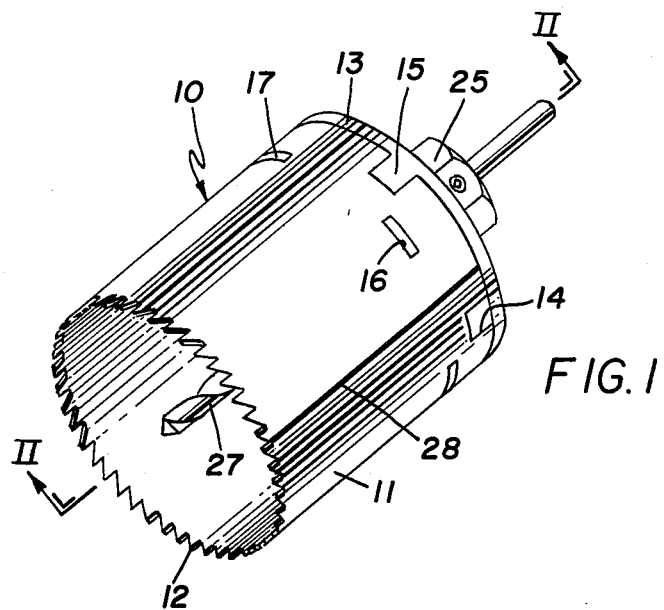
FIG. 1 is a perspective view of a hole saw embodying the principles of the present invention.

Referring first to FIG. 1, wherein are best shown the general features of the invention, the hole saw, indicated generally by the reference numeral 10, is shown as consisting of a hardened metal tube 11, having teeth 12, formed on one end edge, and a cap 13 formed of a tough polymer fitted to the other end of the tube. Means is provided for the locking cap 13 and the tube 11 together in driving relationship.

Axially extending notches 14 of generally rectangular configuration are formed on the end edge of the tube at the other end from the teeth 12 and similar rectangular lugs 15 are formed on the cap 13 to fit snugly in the notches. Apertures 16 are formed in the tube adjacent the said other end and resilient detent fingers 17 are formed on the cap to snap into the apertures to prevent relative axial movement between the tube and the cap. As is evident in the drawing, the apertures 16 are of generally thin rectangular configuration and have one long side lying generally in a plane perpendicular to the axis of the tube.

A mandrel 25 is shown mounted on the cap and it carries a drill 27 located axially of the tube. The tube is also shown as having a longitudinal seam 28.

Figure 2:
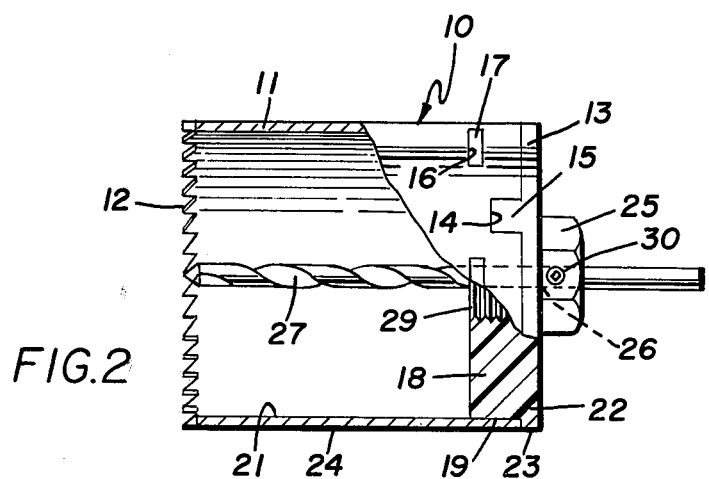
FIG. 2 is a sectional view of the saw taken on the line II—II of FIG. 1.

Referring next to FIG. 2, it can be seen that the cap 13 has a first portion 18 with an outer cylindrical surface 19 which fits snugly in the inner surface 21 of the tube. The cap also has a second portion 22 having an outer cylindrical surface 23, which is the same size and acts as an extension of the outer cylindrical surface 24 of the tube. It can be seen that the mandrel 25 is provided with a central bore 26 in which the drill 27 lies. The cap has a threaded bore 29 in which a threaded portion of the mandrel 25 is located. A set of screw 30 in the mandrel 25 locks the drill 27 in place.

FIGS. 4 and 5 show the details of the cap 13 which is particularly indicated as an injection molded element and which in the preferred embodiment is formed of the polycarbonate known as Lexan. The first portion 18, which fits snugly into the tube, is shown as consisting of 4 segments each of which carries one of the lugs 15. The resilient fingers 17 are located in the spaces between the segments and, as clearly shown in FIG. 5, each resilient finger carries a tooth 31 at its outermost end to lock in respective aperture 16 in the tube.

FIG. 6 is a flow chart of the process for forming the hole saw 10 and, particularly, of forming the tube 11. The first step 32 is to cut a suitable strip of sheet steel which, in the preferred embodiment, is high carbon steel, but which also may be high speed steel, the criterion being as to whether the steel is capable of being heat treated to provide hard teeth. The next step 33 consists in a stamping or blanking operation which not only roughs out the teeth 12, but also forms the notches 14 and the apertures 16. In the next step 34 the teeth 12 are ground; in the preferred embodiment, a large number (as many as 200) of the rough strips are assembled and clamped in a grinding machine and the teeth are ground on the entire assemblage at the same time. The grinding machine used is of the more-or-less conventional type which is used to grind a plurality of hacksaw blades in a similar manner.

The next step 35 is to bend the strip into a tube in such a manner that the teeth 12 appear on one end edge, after which, in step 36, the seam 28 is welded and any bead formed on the outside of the surface of the tube is ground off. The finished tube is then subjected to a heat treatment in step 37, whereby the teeth are made very hard. In step 38 the heat-treated tube 11 is then assembled with the cap 13 to form the finished hole saw.

The operation of the hole saw and its attendant advantages will now be readily understood in view of the above description. Normally, the user would have several hole saws, one of each of several common diameters, but he would only have a single mandrel 25. First of all, the mandrel 25 is assembled to the hole saw. The drill 27 is then inserted and locked in place by the set screw 30. The shank is then chucked in the ordinary electric drill and the attendant assembly is then used for drilling holes either in wood or metal. Normally, the teeth 12 would be given a substantial set in both the inner and outer direction, so that the plug remaining in the interior of the hole saw due to the trepaning operation can be easily removed.

Because the tube is formed of high carbon steel which is heat-treated, is it not only possible to cut various metals with the saw, but even when cutting wood the life of the teeth is much longer. Construction of the hole saw by the use of the strips formed into a tube (instead of deep drawing) makes this possible, since it is impossible to deep draw the type of steel providing the high carbon heat-treatable characteristic. The fact that large numbers of the strips can be ground together in more-or-less conventional grinding machinery, tends to reduce the cost appreciably, since cup-formed hole saws must necessarily have their teeth formed one at a time. In other words, the present hole saw is not only better, since it has high carbon heat-treated teeth, but the cost of producing such a superior hole saw is reasonable.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Hole saw, comprising:
    a. a hardened metal tube having teeth formed at one end edge,
    b. a cap formed of a tough polymer fitted to the other end of the tube, and
    c. means locking the cap and the tube together in driving relationship, the means consisting of axially-extending notches formed on the said other end of the tube and torque lugs laterally formed on the cap to fit snugly in the notches, apertures being formed on the tube adjacent the said other end and resilient detent fingers being formed on the cap to snap into the apertures to prevent relative axial movement between the tube and cap.

2. Hole saw as recited in claim 1, wherein the cap has a first portion having a cylindrical surface with a diameter equal to that of the inner surface of the tube and fits snugly therein and has a second portion having a cylindrical surface with a diameter equal to that of the outer surface of the tube.

3. Hole saw as recited in claim 1, wherein a mandrel is connected to the center of the cap, the mandrel being formed with a concentric bore for holding a drill.

4. Hole saw as recited in claim 1, wherein the tube is formed of high carbon steel in which the teeth have been punched and then ground and which has then been heat treated.

* * * * *